Patented Mar. 9, 1943

2,313,501

UNITED STATES PATENT OFFICE 2,313,501

PROCESS FOR PREPARING METHYLENE DIALKYL MALONATES

Gustave Bryant Bachman, La Fayette, Ind., and Howard A. Tanner, Rochester, N. Y., assignors to Eastman Kodak Company, Rochester, N. Y., a corporation of New Jersey No Drawing. Original application August 15, 1939, Serial No. 290,318. Divided and this application June 7, 1940, Serial No. 339,392

6 Claims. (Cl. 260—485)

This invention relates to the preparation of methylene dialkyl malonates.

Methylene dialkyl malonates have been prepared heretofore by two methods. One of these comprises the reaction of methylene iodide with dialkyl malonates, and the other, the reaction of formaldehyde with dialkyl malonates, in the presence of a base, in solution in alcohol solvents. The methylene iodide process is unsatisfactory, owing to the fact that only very small yields of methylene dialkyl malonates can be obtained. In addition, methylene iodide is an expensive starting material. The aforesaid formaldehyde process involves the use of less expensive starting materials than does the methylene iodide process, and sometimes gives more satisfactory yields of methylene dialkyl malonates than does the methylene iodide process. However, the formaldehyde process does not give consistently satisfactory yields from batch to batch, even though conditions are apparently identical during the preparation of the different batches.

It is, therefore, an object of our invention to provide a new process for preparing methylene dialkyl malonates. It is a further object of our invention to provide a process for preparing methylene dialkyl malonates which gives more consistent yields from preparation to preparation. It is a further object of our invention to provide a process for preparing methylene dialkyl malonates which gives a higher yield than attainable by prior processes. Other objects will become apparent hereinafter.

According to our invention, we react a dialkyl malonate with formaldehyde, in the presence of an alkali metal salt of a carboxylic acid, in solution in a substantially anhydrous carboxylic acid solvent. By a substantially anhydrous carboxylic acid solvent we mean a carboxylic acid solvent containing not more than about 5% by weight of water. We have found that glacial acetic acid is advantageously employed as the solvent. Propionic acid is a good solvent for this purpose. Formic acid or any other substantially anhydrous carboxylic acid solvents can be employed, although usually less advantageously then acetic acid.

The alkali metal salts of carboxylic acids, contrary to their behavior in water solution, act as strong bases in solution in substantially anhydrous carboxylic acid solvents and catalyze the reaction of formaldehyde with dialkyl malonates to give methylene dialkyl malonates. Potassium salts, particularly potassium acetate, are advantageously employed. Any alkali metal salt of a carboxylic acid can be employed, although sodium salts are generally less advantageously employed. The alkali metal salt need not be of the same carboxylic acid as is used as a solvent. Thus, potassium propionate, potassium benzoate, or potassium phthalate can be used in conjunction with acetic acid solvent or any other carboxylic acid solvent. The strong bases can be formed by incorporating alkali metal salts of acids weaker than the carboxylic acid employed as solvent in the carboxylic acid solvent. Thus, di- or trisodium phosphate can be incorporated in acetic acid solvent to form a strong basic solution of sodium acetate in acetic acid.

Our new process is advantageously carried out in the presence of a polymerization inhibitor, such as the kind known to inhibit polymerization of monomeric vinyl compounds. Copper salts, particularly copper salts of carboxylic acids, e. g. cupric acetate, are advantageously employed as polymerization inhibitors. Cupric chloride is also especially useful. Iron salts, e. g. ferric acetate, are likewise very useful inhibitors. Phenols, particularly hydroquinone, are also suitable inhibitors.

In our new process the molar ratio of formaldehyde to dialkyl malonate can vary widely, e. g. from about 0.5:1 to about 3:1 and is advantageously about 2:1. Heat accelerates the formation of methylene dialkyl malonates according to our new process.

The ratio of carboxylic acid solvent to dialkyl malonate can vary widely, e. g. from about 100 grams to about 400 grams of solvent for each gram-mole of dialkyl malonate. Advantageously from about 200 to about 400 grams of solvent per gram-mole of dialkyl malonate is employed. If desired the carboxylic acid solvent may be diluted with carboxylic acid anhydride, e. g. acetic acid with acetic anhydride.

The amount of base employed in the carboxylic acid solvent can vary widely, e. g. from about 2 to about 10 grams per gram-mole of dialkyl malonate. Ordinarily from about 5 to about 10 grams of base (e. g. potassium acetate) per gram-mole of dialkyl malonate is advantageously employed.

The amount of polymerization inhibitor can vary widely, but for best results it is advantageously employed in considerably larger amounts than ordinarily used to inhibit polymerization. With copper and iron salts from about 6 to about 15 grams of salt per gram-mole of dialkyl malonate used are advantageously employed.

The following example will serve to demonstrate the manner of practicing our invention. This example is not intended to limit our invention.

EXAMPLE 1

30 g. of paraformaldehyde (trioxymethylene), 5 g. of copper carbonate and 5 g. of potassium acetate were added to 200 g. of glacial acetic acid. The resulting mixture was warmed (e. g. to gentle refluxing) until a solution was obtained. The resulting solution was maintained at the temperature of gentle refluxing and 80 g. of diethyl malonate were added dropwise to the solution over a period of about one-half hour. At the end of this time the reaction mixture was fractionally distilled under sub-atmospheric pressure (18 mm. of mercury pressure). Fractions were collected at 40° to 70° C. (166 g.), 70° to 110° C. (41 g.) and 110° to 150° C. (73 g.). The latter two fractions were again fractionally distilled at atmospheric pressure. Fractions were collected at 110° to 130° C. (30 g.), 130° to 205° C. (17 g.), 205° to 225° C. (37 g.) and 225° to 240° C. (9 g.). The fraction boiling at 205° to 225° C. was practically pure methylene diethyl malonate. Most of this fraction boiled at 206° to 210° C. From the fraction boiling at 205° to 225° C. pure methylene diethyl malonate can be obtained by redistillation. Pure methylene diethyl malonate, prepared in this manner, boiled at 210° C. (760 mm.) and had a density of 1.052 (25/4) and a refractive index of 1.432 (25/D). Methylene diethyl malonate is a colorless liquid with a strong acrylic odor and is a lachrymator. Upon standing, it forms a soft waxy white polymer, the time of polymerization varying from one day to several weeks, probably depending upon the purity of the material. On heating, the polymer reverts quantitatively to the monomer.

The yield of methylene diethyl malonate obtained in the foregoing example (37 g.) was 43% based on the 80 grams of diethyl malonate put into the reaction. Inasmuch as 15 g. of diethyl malonate was recovered from the fraction boiling at 130° to 205° C., the yield was 53% based on the 65 grams of diethyl malonate actually used up in the reaction. The foregoing procedure consistently gives yields of 40% or better.

In a similar manner methylene dimethyl malonate can be prepared from formaldehyde and dimethyl malonate, methylene dipropyl malonates from formaldehyde and dipropyl malonates, methylene dibutyl malonates from formaldehyde and dibutyl malonates, and methylene diamyl malonates from formaldehyde and diamyl malonates. Such methylene dialkyl malonates can be represented by the following general formula:

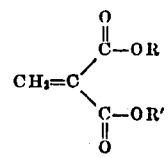

wherein R and R' represent alkyl groups of the formula $C_n$ and $H_{2n+1}$ wherein $n$ represents a positive integer of from 1 to 5.

The following table sets forth data to show the results obtained in accordance with various embodiments of our invention as applied to the preparation of methylene diethyl malonate.

Table I

| Batch | Grams of diethyl malonate put into process | Molar ratio formaldehyde to diethyl malonate | Grams of solvent/gram-mole diethyl malonate | Grams of base/gram-mole of diethyl malonate | Grams of inhibitor/gram-mole of diethyl malonate | Grams of methylene diethyl malonate obtained | Grams of diethyl malonate recovered | Per cent yield of methylene diethyl malonate based on diethyl malonate used |
|---|---|---|---|---|---|---|---|---|
| 1 | 80 | 2:1 | Acetic acid-400 | Potassium acetate-6 | Hydroquinone-1 | 27.5 | 16 | 40 |
| 2 | 80 | 2:1 | ...do... | Potassium acetate-10 | Cupric acetate-10 | 46 | 21 | 72 |
| 3 | 80 | 2:1 | ...do... | ...do... | Ferric acetate-14 | 22.5 | 11 | 31 |
| 4 | 80 | 1.3:1 | ...do... | ...do... | Cupric chloride-10 | 31 | 19 | 47 |
| 5 | 80 | 2.1 | Acetic acid-160 | Disodium phosphate-16 | Cupric acetate-7 | 22 | 12 | 30 |

We have also found that methylene dialkyl malonates can be prepared in consistent yields by reacting formaldehyde with dialkyl malonates, in the vapor phase, accelerating the reaction with a basic catalyst. Basic catalysts, such as metal phosphates (e. g. copper phosphate, aluminum phosphate and di- or tri-sodium phosphate), soda lime and alumina, are advantageously employed. The metal phosphates are advantageously employed and may be employed in a powder form, supported on glass wool or copper turnings for example, or may be employed in the form of lumps.

Instead of employing solid basic catalysts, amines which vaporize under the conditions of the vapor phase reaction may be employed. Piperidine and diethylamine are suitable amines for this purpose.

According to one embodiment of our invention, we introduce a dialkyl malonate and a 40% (by weight) aqueous solution of formaldehyde into one end of a reaction chamber, advantageously a glass tube (packed, to permit a flow of vapors, with a metal phosphate catalyst) mounted vertically in an electric resistance furnace, heated to a temperature above the boiling point of the dialkyl malonate. The dialkyl malonate and formaldehyde solution vaporize and, in the presence of the basic catalyst, react to form methylene dialkyl malonate. The gaseous reaction products, comprising methylene dialkyl malonate, unreacted dialkyl malonate and water, pass out of the other end of the reaction tube, where they may be collected in a suitable condenser. The non-aqueous layer of the condensate is then separated from the aqueous layer and dried, e. g. over calcium sulfate ("Drierite") and finally fractionally distilled to obtain methylene dialkyl malonate and unreacted dialkyl malonate. The unreacted dialkyl malonate can, of course, be recycled through the reaction chamber to obtain more methylene dialkyl malonate.

The reaction chamber is advantageously heated to a temperature within the range 250° to 500° C. About 400° C. is especially suitable. The formaldehyde can be introduced into the reaction chamber as a gas, but is advantageously employed in the form of a 40% aqueous solution. Inasmuch as our vapor phase process is a continuous process, the reaction chamber need not be large. Several pounds of crude methylene dialkyl malonate per day can be prepared, using a glass tube about one inch in diameter and about three feet long, as a reaction chamber.

The following table sets forth data to show the results obtained in accordance with our vapor phase process, when formaldehyde and diethyl malonate were introduced in the reaction chamber at equimolecular rates. The reactants may be introduced at unequimolecular rates.

At the end of this time it was dissolved in two to three times its volume of acetone and the acetone solution was poured into water to precipitate the copolymer. The copolymer was thoroughly washed with water and dried at 185° F. Film from such a copolymer was hard and tough, but somewhat brittle.

EXAMPLE 4

*Copolymer of dimethyl itaconate with methylene diethyl malonate*

14.6 g. of dimethyl itaconate, 17.2 g. of methylene diethyl malonate and 0.03 g. of benzoyl peroxide were mixed together and heated at 165° C. for about 6 days. At the end of this time, the

*Table II*

| Batch | Reactants | Catalyst | Temp. | Yield per 100 grams of diethyl malonate used | |
|---|---|---|---|---|---|
| | | | | Methylene diethyl malonate | Diethyl malonate recovered |
| | | | °C. | | |
| 1 | 40% aqueous formaldehyde-diethyl malonate | Aluminum phosphate on glass wool | 300 | 6 | 30 |
| 2 | do | do | 420 | 17 | 25 |
| 3 | Gaseous formaldehyde-diethyl malonate | do | 420 | 10 | 27 |
| 4 | Solution of formaldehyde in diethyl malonate (solution containing 3% by weight of piperidine) | Piperidine | 350 | 6 | 22 |
| 5 | 40% aqueous formaldehyde-diethyl malonate | Disodium phosphate lumps | 250 | 11 | 18 |
| 6 | do | Copper phosphate on copper turnings | 300 | 15 | 7 |

Methylene dialkyl malonates can be copolymerized with other olefinic compounds, e. g. vinyl or acrylic compounds, to give resinous materials. The copolymers have properties different from a simple mixture of the polymer of the methylene dialkyl malonate and the polymer of the other olefinic compound. The following examples are illustrative of such copolymers.

EXAMPLE 2

*Copolymer of vinyl acetate and methylene diethyl malonate*

75 g. of vinyl acetate and 25 g. of methylene diethyl malonate and 0.1 g. of benzoyl peroxide were mixed together. The mixture was heated on a steam bath for about 12 hours. At the end of this time, the reaction mixture was almost solid. After five days heating on the steam bath, the reaction product was dissolved in two to three times its volume of acetone and the acetone solution was poured into water to precipitate the copolymer. The copolymer was thoroughly washed with water and dried for about 48 hours at 185° F.

Such a copolymer can be coated from an acetone solution (1 part of copolymer to from 2½ to 4 parts of acetone) on to a film-forming surface. Upon allowing the acetone to evaporate from such a coating, a transparent film of copolymer can be stripped from the surface. Tough films can be made from resinous materials prepared by copolymerizing mixtures of vinyl acetate and methylene diethyl malonate in which 85 to 90% by weight of the mixture is vinyl acetate.

EXAMPLE 3

*Copolymer of methyl methacrylate and methylene diethyl malonate*

60 g. of methyl methacrylate, 17 g. of methylene diethyl malonate and 0.08 g. of benzoyl peroxide were mixed together and heated on a steam bath. The mixture become solid within 48 hours.

mixture was a sticky viscous liquid. This sticky liquid was dissolved in two or three times its volume of acetone and the acetone solution was poured into water to precipitate the resin. A sticky lump of resin formed. The sticky lump was steamed for several hours to give a hard, brittle resin.

EXAMPLE 5

*Copolymer of vinyl acetate and styrene with methylene diethyl malonate*

4 g. of vinyl acetate, 3 g. of styrene, 3 g. of methylene diethyl malonate and 0.01 g. of benzoyl peroxide were mixed together and allowed to stand in the sunlight each day for one week. The mixture was then dissolved in two to three times its volume of ethyl acetate. The ethyl acetate solution was poured into methanol to precipitate the resin. A film made from the resin was clear, but a little brittle.

We have found that acetal resins can be prepared from copolymers of vinyl esters and methylene dialkyl malonates by subjecting the copolymer to hydrolysis and concomitantly condensing the hydrolysis product with an aldehyde, e. g. acetaldehyde, propionaldehyde, butyraldehyde or benzaldehyde. Such acetal resins can be coated from suitable solvents to give film or sheet useful as a support for photographic emulsion coatings. The following example illustrates the preparation of such acetal resins.

EXAMPLE 6

115 g. of methylene diethyl malonate, 1035 g. of vinyl acetate and 1.15 g. of benzoyl peroxide catalyst were mixed together and heated on a steam bath for several days until copolymerization was completed. The reaction product was then dissolved in two to three times its volume of acetone and the acetone solution poured into hot water to precipitate the resin. The precipitated resin was thoroughly washed in hot circulating water for about 6 hours. Analysis showed that the resin contained an ethoxyl group content of 3.8% indicating that 7.3% of the momeric molecules which had copolymerized were methylene diethyl malonate.

2 lbs. of the above copolymer were dissolved in 8 lbs. of ethanol. To this solution were added 81 g. of hydroxylamine hydrochloride dissolved in 175 g. of water, 1 lb. of paraldehyde and 3 lbs. of hydrochloric acid (sp. g. 1.18). After thorough mixing the resulting mixture was allowed to stand at 40° C. for 7 days. At the end of this time, the reaction mixture was diluted with two to three times its volume of ethanol. The diluted reaction mixture was poured into water to precipitate the resin. The precipitated resin was thoroughly washed with water and dried at 185° F. The product on analysis showed an acetate group content equivalent to 20.9% by weight of polyvinyl acetate and a hydroxyl group content equivalent to 9.7% by weight of polyvinyl alcohol.

Methylene dialkyl malonates can be condensed with dienes (i. e. compounds containing a —C=C—C=C— group) to give esters useful as intermediates in organic syntheses and useful as plasticizers for cellulose derivatives, e. g. cellulose acetate and cellulose nitrate, and as plasticizers for resins, e. g. polyvinyl acetal resins.

Methylene dialkyl malonates condense readily with butadiene, isoprene and 2,3-dimethyl-butadiene. The condensations of methylene dialkyl malonates with dienes are advantageously effected in the presence of a solvent for the reactants. Heat accelerates the condensations.

The following examples are illustrative of the condensations of methylene dialkyl malonates with dienes.

EXAMPLE 7

13 g. of 1,3-butadiene and 27 g. of methylene diethyl malonate were dissolved in 200 cc. of benzene. The resulting solution was gently refluxed for about one hour. At the end of this time, the reaction mixture was subjected to fractional distillation and a colorless liquid product, boiling at 163° to 166° C. (40 mm.), was obtained. It can be represented by the following formula:

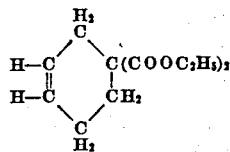

The condensation of 1,3-butadiene with methylene diethyl malonate also takes place, in benzene solution, at —70° C., upon allowing the solution to stand for about 24 hours.

EXAMPLE 8

31 g. of 2,3-dimethylbutadiene and 65 g. of methylene diethyl malonate were placed in 400 cc. of benzene. The resulting mixture was heated at 80° C. for about 3 hours. At the end of this time, the reaction mixture was subjected to fractional distillation. 70 g. of a colorless liquid boiling at 160° to 168° C. (30 mm.) was obtained. It can be represented by the following formula:

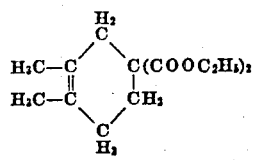

EXAMPLE 9

20 g. of isoprene and 44 g. of methylene diethyl malonate were placed in 250 cc. of benzene. The resulting mixture was heated at about 20° C. for about 18 hours. At the end of this time, the reaction mixture was subjected to fractional distillation. 35 g. of a colorless product boiling at 145° to 146° C. (15 mm.) was obtained. It can be represented by the following formula:

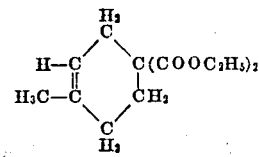

EXAMPLE 10

21 g. of anthracene and 25 g. of methylene diethyl malonate were mixed together and heated at a temperature of about 220° C. for about 6 hours. The solid reaction product was recrystallized from benzene and obtained as white crystals (40 g.) melting at 126° to 127° C. It can be represented by the following formula:

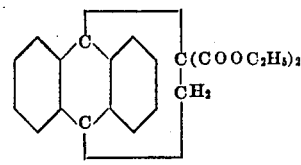

The esters prepared as demonstrated in the foregoing examples can be saponified to the corresponding dibasic acids which, upon heating, lose carbon dioxide and give a monocarboxylic acid.

This application is a division of our copending application Serial No. 290,318, filed August 15, 1939, now U. S. Patent 2,212,506, dated August 27, 1940.

What we claim as our invention and desire to be secured by Letters Patent of the United States is:

1. A process for preparing a methylene dialkyl malonate comprising reacting, in the vapor phase, formaldehyde with a dialkyl malonate, in the presence of a basic metal phosphate catalyst.

2. A process for preparing a methylene dialkyl malonate comprising reacting, in the vapor phase, formaldehyde with a dialkyl malonate, in the presence of a basic sodium phosphate catalyst.

3. A process for preparing a methylene dialkyl malonate comprising reacting, in the vapor phase, formaldehyde with a dialkyl malonate in which the alkyl groups are of the formula $C_nH_{2n+1}$ wherein $n$ represents a positive integer of from one to five, in the presence of a basic metal phosphate catalyst.

4. A process for preparing a methylene dialkyl malonate comprising reacting, in the vapor phase, formaldehyde with a dialkyl malonate in which the alkyl groups are of the formula $C_nH_{2n+1}$ wherein $n$ represents a positive integer of from one to five, in the presence of a basic sodium phosphate catalyst.

5. A process for preparing methylene diethyl malonate comprising reacting, in the vapor phase, formaldehyde with diethyl malonate, in the presence of a basic metal phosphate catalyst.

6. A process for preparing methylene diethyl malonate comprising reacting, in the vapor phase, formaldehyde with diethyl malonate, in the presence of a basic sodium phosphate catalyst.

GUSTAVE BRYANT BACHMAN.
HOWARD A. TANNER.